United States Patent
Cota

(10) Patent No.: US 8,553,501 B1
(45) Date of Patent: Oct. 8, 2013

(54) TRACKING SYSTEM FOR UNDERWATER EQUIPMENT

(76) Inventor: Ross Cota, Mesa, AZ (US)

( * ) Notice: Subject to any disclaimer, the term of this patent is extended or adjusted under 35 U.S.C. 154(b) by 407 days.

(21) Appl. No.: 12/938,023

(22) Filed: Nov. 2, 2010

Related U.S. Application Data

(60) Provisional application No. 61/257,574, filed on Nov. 3, 2009.

(51) Int. Cl.
G01V 1/38 (2006.01)

(52) U.S. Cl.
CPC .................................. G01V 1/38 (2013.01)
USPC ........................................... 367/131; 43/100

(58) Field of Classification Search
USPC .............. 367/7, 131, 134; 43/100, 102, 103
See application file for complete search history.

(56) References Cited

U.S. PATENT DOCUMENTS

| | | | | |
|---|---|---|---|---|
| 4,262,379 A | * | 4/1981 | Jankiewicz | 441/2 |
| 6,738,314 B1 | * | 5/2004 | Teeter et al. | 367/131 |
| 2004/0030496 A1 | * | 2/2004 | Brodie | 701/213 |
| 2004/0056779 A1 | * | 3/2004 | Rast | 340/985 |

* cited by examiner

Primary Examiner — Krystine Breier
(74) Attorney, Agent, or Firm — Schmeiser, Olsen & Watts LLP

(57) ABSTRACT

A system for tracking underwater equipment is disclosed which includes a buoy and an underwater animal trap connected to the buoy. A position sensing unit is mounted to the buoy, wherein the position sensing unit includes a satellite signal receiver which computes location data in response to receiving signals from multiple satellites, and a transmitter which transmits the location data. A tracking device can be used to display the location data received from the position sensing unit, allowing the position of the buoy and associated underwater animal trap to be tracked. A method of tracking an underwater animal trap is disclosed which includes coupling a position sensing unit to a buoy, and tracking the location of the buoy with a tracking unit. The buoy is coupled to an underwater animal trap, and the position sensing unit computes buoy location data in response to receiving signals from multiple satellites.

12 Claims, 13 Drawing Sheets

TRACKING SYSTEM FOR UNDERWATER EQUIPMENT

CROSS REFERENCE TO RELATED APPLICATION

This application claims priority to U.S. Provisional Patent Application to Ross Michael Imperial Cota entitled "Electronic Tracking Device and Associated Method," Ser. No. 61/257,574, filed Nov. 3, 2009, now pending, the disclosures of which are hereby incorporated entirely herein by reference.

BACKGROUND OF THE INVENTION

1. Technical Field

This invention relates to tracking devices and, more particularly, to an electronic tracking device for locating and tracking underwater equipment.

2. State of the Art

Lobster fishing is the commercial or recreational harvesting of marine lobsters or spiny lobsters. This is a major marine industry in the state of Maine, as well as other northeastern ports. Lobstermen fish for the American lobster, scientifically referred to as *Homarus Americanus*. In most ports, lobsters can only be legally caught in lobster traps, also called pots. These traps are either rectangular-shaped or half cylinders and were once made from oak, but are now primarily made from wire mesh covered with a thick layer of plastic to reduce oxidation of the metal.

Lobster traps are often connected to a buoy with a rope, called a line, and the lobster fishermen locate the traps by locating the buoy and following the line. The problem is that the lobster traps can break loose from the buoy and be lost, or the buoy, line and trap can be carried away from the fishing location. Whether the units break loose from their tethers or are taken out of range by other sea life, the loss of this expensive equipment is not only costly to fishermen, but also compromises their catches, which often constitute the livelihood of lobster fishermen.

This problem is not limited to lobster fishermen and their traps. Underwater animal traps are used to catch other types of underwater animals, such as crabs, shrimp, and fish, for example. Underwater equipment is also used for work other than fishing or trapping of animals. Underwater equipment is used to monitor underwater animal life, to build, drill or explore underwater structures, and to search and retrieve structures lost at sea. These are just a few examples of situations where underwater equipment is used and where it may be desirable to locate or track the position and status of the underwater equipment.

Accordingly, a need remains for an electronic tracking device in order to overcome the above-noted shortcomings. The present invention satisfies such a need by providing an electronic tracking device that is convenient and easy to use, lightweight yet durable in design, versatile in its applications, and designed for providing users with a convenient and easy means of locating and tracking underwater equipment.

DISCLOSURE OF THE INVENTION

This invention relates to tracking devices and, more particularly, to a system for locating and tracking underwater equipment. A particular embodiment of the system for tracking underwater equipment is disclosed which includes a buoy and an underwater animal trap mechanically coupled to the buoy. A position sensing unit is mounted to the buoy, wherein the position sensing unit includes a satellite signal receiver which computes location data in response to receiving signals from multiple satellites, and a transmitter which transmits the location data. In some embodiments the system for tracking underwater equipment includes a tracking device which displays the location data in response to receiving the location data from the position sensing unit. In some embodiments the transmitter is a transponder which transmits the location data in response to receiving a transmission request signal from the tracking device. In some embodiments the transponder transmits a sonar signal in response to receiving a transmission request signal. In some embodiments the transmitter transmits an identification code unique to the position sensing unit. In some embodiments communication between the transmitter and the tracking device is secure.

In some embodiments the system for tracking underwater equipment includes a secondary position sensing unit coupled to a secondary buoy. The secondary position sensing unit includes a secondary satellite signal receiver and a secondary transmitter. The secondary receiver computes secondary location data in response to receiving signals from multiple satellites. The secondary transmitter transmits the secondary location data. In some embodiments the position sensing unit includes a processor. In some embodiments the system for tracking underwater equipment further includes a temperature sensor coupled to the trap. In some embodiments the temperature sensor sends temperature data to the tracking device. In some embodiments of the system for tracking underwater equipment a plurality of underwater animal traps are mechanically coupled to the buoy. In some embodiments a temperature sensor is coupled to two or more of the plurality of underwater animal traps.

A system for tracking underwater equipment is disclosed. In a particular embodiment the system for tracking underwater equipment includes a buoy and a plurality of pieces of underwater equipment mechanically coupled to the buoy. A position sensing unit is attached to the buoy. The position sensing unit includes a satellite signal receiver which computes buoy location data in response to receiving signals from multiple satellites. The position sensing unit also includes a processor and a transmitter. The transmitter transmits buoy location data from the satellite signal receiver and transmits processed data from the processor. The system for tracking underwater equipment includes a tracking device communicably coupled to the transmitter. In some embodiments the system for tracking underwater equipment includes a secondary position sensing unit coupled to a secondary buoy. The secondary buoy is connected to one of the plurality of pieces of underwater equipment. The secondary position sensing unit includes a secondary satellite signal receiver and a secondary transmitter. The secondary receiver computes secondary location data representing the location of the secondary buoy in response to receiving signals from multiple satellites. The secondary transmitter is communicably coupled to the tracking device.

In some embodiments the transmitter is a transponder which transmits data in response to receiving a transmission request signal. In some embodiments the transmitter transmits sonar data in response to receiving a transmission request signal. In some embodiments the transmitter transmits an identification code unique to the position sensing unit. In some embodiments communication between the position sensing unit and the tracking device is secure. In some embodiments a temperature sensor is connected to each of the pieces of underwater equipment.

A method of tracking an underwater animal trap is disclosed. The method includes coupling a position sensing unit to a buoy, and tracking the location of the buoy with a tracking unit. The buoy is coupled to an underwater animal trap, and the position sensing unit computes buoy location data in response to receiving signals from multiple satellites. In some embodiments the method includes coupling a secondary position sensing unit to a secondary buoy, where the secondary position sensing unit computes secondary buoy location data in response to receiving signals from multiple satellites. In some embodiments the method includes tracking the location of the secondary buoy in response to the tracking unit receiving secondary buoy location data from the secondary position sensing unit. In some embodiments the method of tracking an underwater animal trap includes transmitting a request for location data from the tracking unit to the position sensing unit. In some embodiments the method includes coupling a temperature sensor to the underwater animal trap, where the temperature sensor sends temperature data to the position sensing unit.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
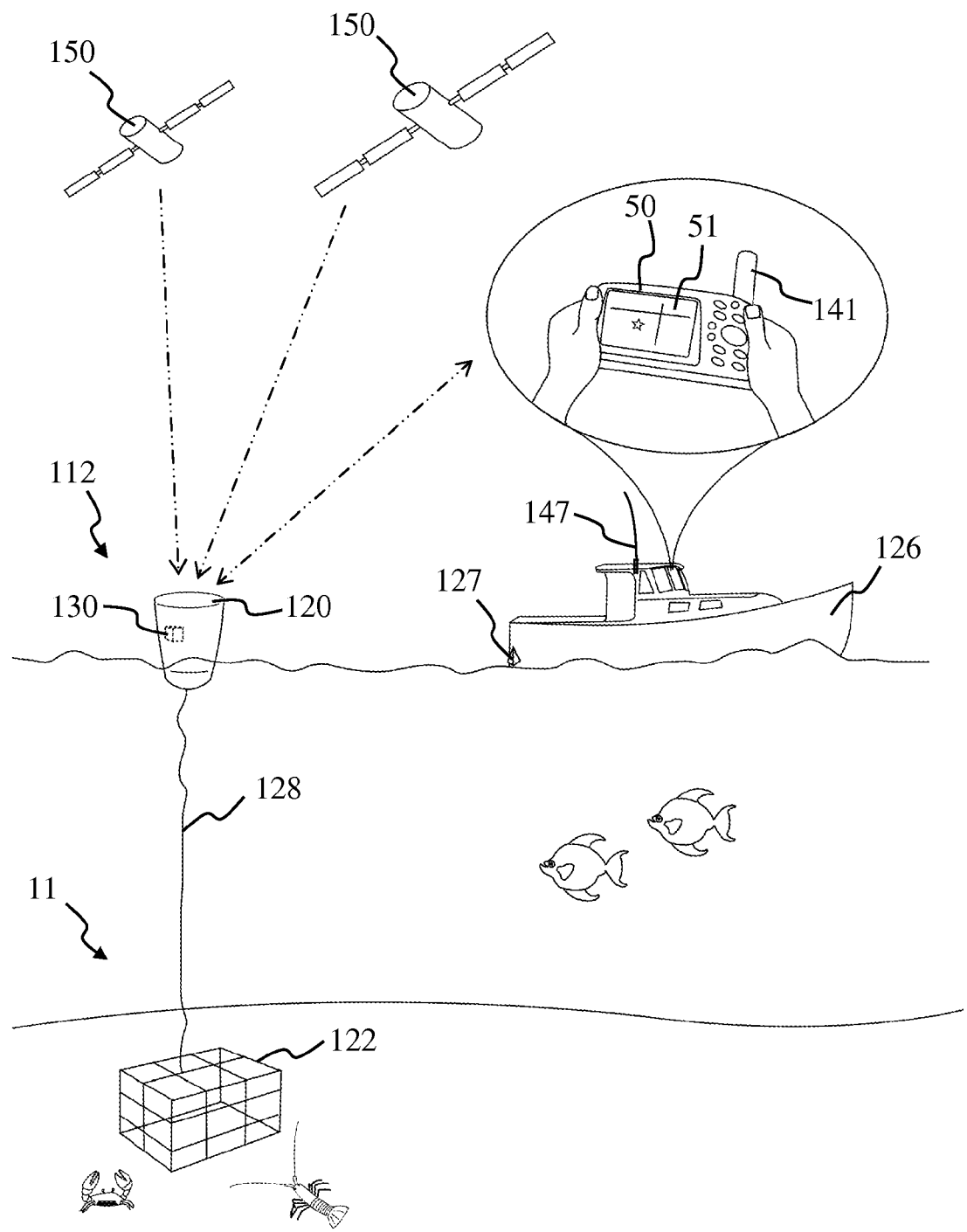
FIG. 1 shows a pictorial view of one embodiment of a system for tracking underwater equipment 112 according to the invention, where system 112 includes buoy 120, position sensing unit 130, and underwater animal trap 122.
Figure 2:
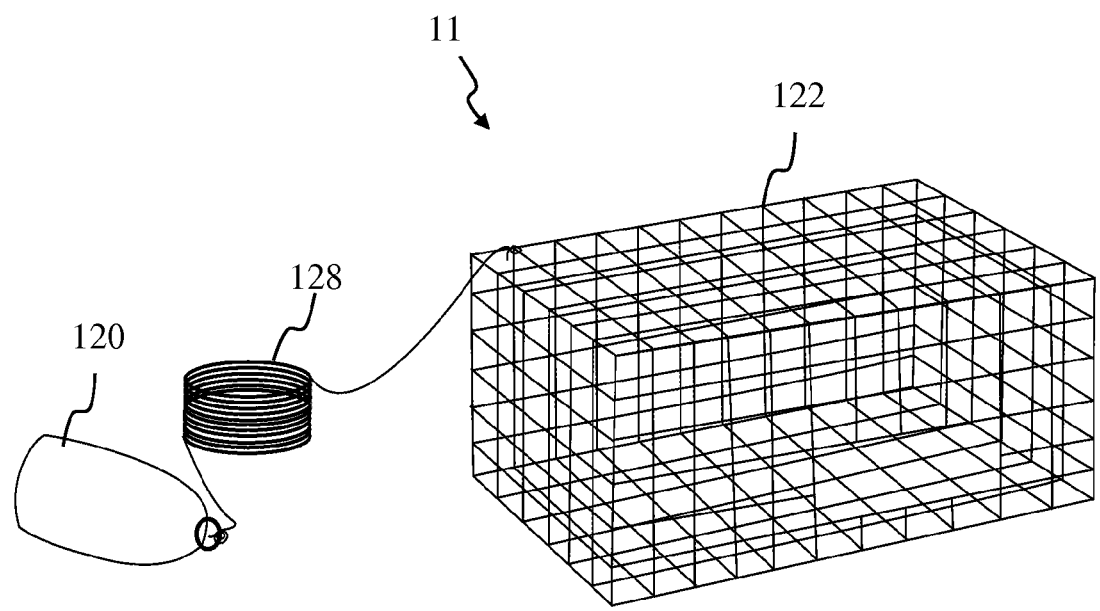
FIG. 2 shows an embodiment of equipment 11 which can be tracked using system for tracking underwater equipment 112 according to the invention, where in this embodiment equipment 11 is lobster trap 122.

As discussed above, embodiments of the present invention relate to tracking devices and, more particularly, to an electronic tracking device for locating and tracking underwater equipment. Determining the location of pieces of underwater equipment is critical to multiple fields of endeavor. The livelihood of lobster and crab fishermen depends on the ability to locate and retrieve their traps. Similarly, harvesters of shrimp, fish, and other underwater animals need to find and retrieve underwater traps and their associated equipment. Other underwater activities such as underwater construction, monitoring, or diving also rely at times on the ability to position and later to retrieve underwater equipment. In some cases there is the need to track the movement of underwater equipment. Disclosed is a system for easily locating and tracking underwater equipment. FIG. 1 shows a pictorial representation of system for tracking underwater equipment 112 according to the invention. System 112 includes underwater equipment 11, which in this embodiment is in the form of lobster trap 122 as shown in FIG. 2. Lobster trap 122 (also referred to as underwater animal trap 122 or trap 122) is mechanically coupled to buoy 120 using line 128. A lobster fisherman has set trap 122, line 128, and buoy 120 as shown in FIG. 1 in order to catch lobster. In order for the lobster fisherman to retrieve the lobsters that are caught, the fisherman must be able to locate and retrieve trap 122. Buoy 120 provides an above-water visual locator, but there are times when buoy 120 and trap 122 moves far from its original location, and there are also times when trap 122 becomes disconnected from buoy 120. System for tracking underwater equipment 112 provides a convenient and quick way to locate and track buoy 120 and underwater equipment 11.

In this embodiment underwater equipment 11 is shown as lobster trap 122. It is to be understood that underwater equipment 11 can be any piece or group of pieces of underwater equipment. In some embodiments underwater equipment 11 is a different type of underwater animal trap such as a crab trap, a shrimp trap, a fish trap, etc. In some embodiments underwater equipment 11 is underwater diving equipment such as air tanks, cameras, lines, weights, etc. In some embodiments underwater equipment 11 is underwater monitoring equipment such as cameras or other sensors monitoring sea life, water chemistry or temperature or status of the sea floor or structures such as shoals and coral reefs. In some embodiments underwater equipment 11 is underwater construction equipment or underwater drilling equipment. Underwater equipment 11 can be any apparatus, item or device that is used underwater and may need to be located or tracked at some time.

Buoy 120 in this embodiment is shown as a floating unit which contains position sensing unit 130. Buoy 120 according to the invention can be any type of buoy in use today or in the future. A buoy is used as a visual indicator for locating items or direction on bodies of water. A buoy in some embodiments is a fixed rigid pole which reaches from the sea floor to above the water for indicating a fixed position, often used for guiding seagoing vessels. A buoy in some embodiments is a floating device connected to a fixed position on the sea floor. A buoy in some embodiments is a floating device connected to an item under the water, often used for locating the underwater item. In this embodiments buoy 120 is connected to underwater equipment 11 using line 128. In some embodiments buoy 120 can be fixed or connected to the sea floor, with underwater equipment connected to buoy 120 using line 128. Buoy 120 can be any type of device connected to underwater equipment 11 used to locate or retrieve underwater equipment 11.

Figure 3:
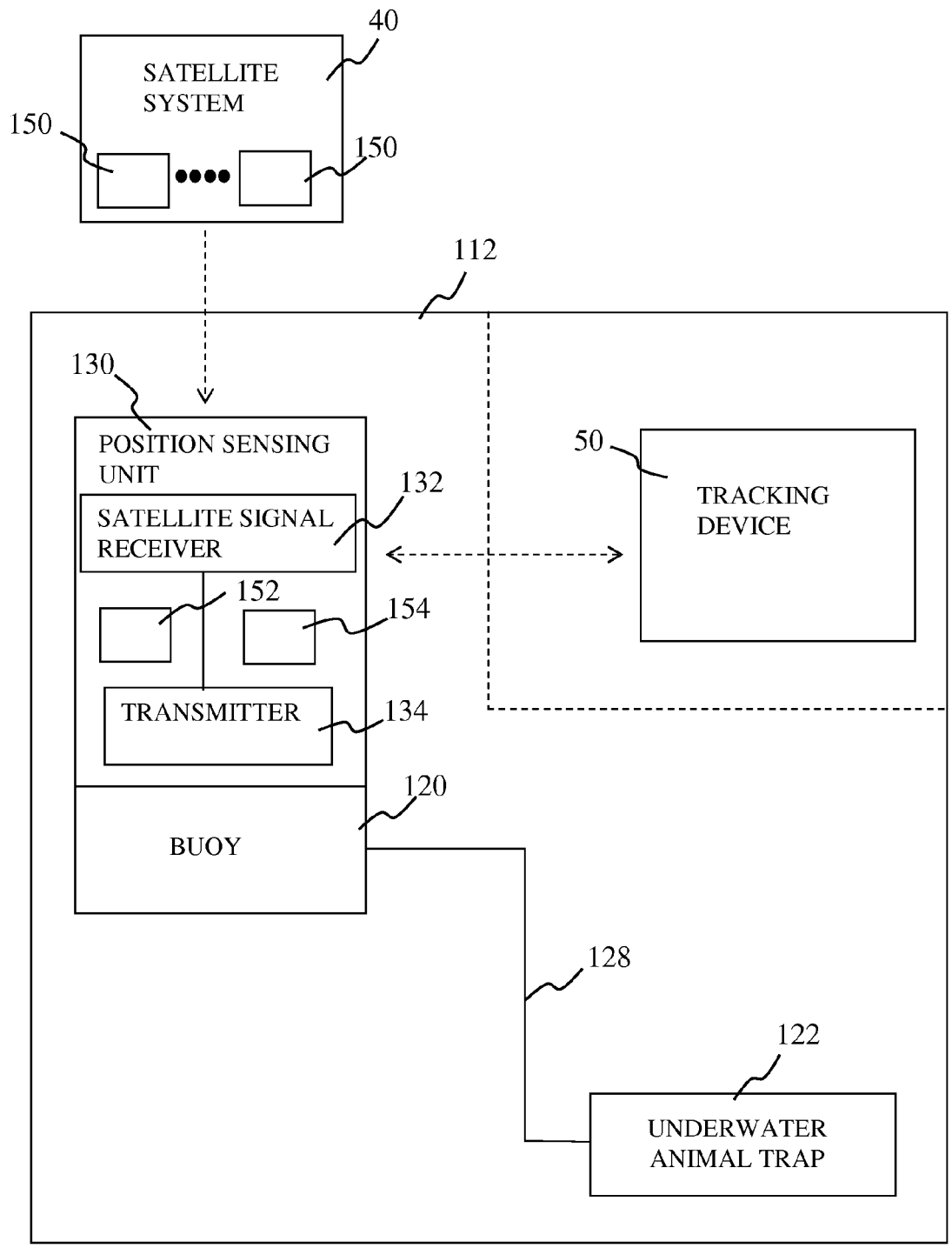
FIG. 3 is a block diagram of one embodiment of system for tracking underwater equipment 112 according to the invention as shown in FIG. 1.

As shown in FIG. 1, position sensing unit 130 is attached to buoy 120. In this embodiment position sensing unit 130 is contained within buoy 120. Position sensing unit 130 can be contained within or attached to buoy 120 in any way which will keep position sensing unit 130 together with buoy 120. Position sensing unit 130 includes satellite signal receiver 132 and transmitter 134, as shown in FIG. 3. FIG. 3 is a block diagram of one embodiment of system for tracking underwater equipment 112 according to the invention as shown in FIG. 1. Satellite signal receiver 132 computes location data in response to receiving signals from multiple satellites 150, which belong to satellite system 40. Transmitter 134 transmits the location data to tracking device 50. Tracking device 50 receives location data from position sensing unit 130 and displays the location data, allowing easy location and tracking of position sensing unit 130 as well as buoy 120 and underwater equipment 11.

In this embodiment satellite system 40 is a set of 24 to 32 Global Positioning System (GPS) satellites 150 as is known in the art. GPS satellite system 40 is run and maintained by the United States for military and commercial use in finding the exact location of the receiver of signals from GPS satellites 150. In this embodiment satellite signal receiver 132 is a GPS receiver, and computes the location of satellite signal receiver 132 in response to receiving signals from multiple GPS satellites 150. In the GPS system, satellites 150 continuously transmit wireless signals which include the time the signal was sent, as well as satellite identification information. Satellite signal receiver 132 is able to compute location data representing the exact longitude, latitude, and elevation of satellite signal receiver 132 upon wireless reception of signals from multiple GPS satellites 150. Often signals from four GPS satellites are used, but this number can vary depending on the specific equipment used and the accuracy desired. Location data is computed by triangulation using the location of the different satellites 150 and the time taken for the multiple satellite 150 signals to reach receiver 132, as is known in the art of GPS systems.

Position sensing unit 130 receives signals from multiple satellites 150, and satellite signal receiver 132 computes the location of satellite signal receiver 132 based on the signals received from multiple satellites 150. Location data is data representing the longitude, latitude, and elevation of satellite signal receiver 132. In some embodiments location data includes only the longitude and latitude of satellite signal receiver 132. In some embodiments location data includes other data in addition to longitude, latitude, and elevation of satellite signal receiver 132. Since satellite signal receiver 132 is a part of position sensing unit 130, the location data computed by satellite signal receiver 132 represents the location of satellite signal receiver 132 and the location of position sensing unit 130.

Transmitter 134 wirelessly transmits the location data representing the location of satellite signal receiver 132. In this embodiment position sensing unit 130 is attached to buoy 120, and so the location data represents the location of buoy 120 and position sensing unit 130 as well as the location of satellite signal receiver 132. Tracking device 50 wirelessly receives the location data transmitted by transmitter 134 of position sensing unit 130. In this way tracking device 50 and transmitter 134 of position sensing unit 130 are communicably coupled. Tracking device 50 and transmitter 134 can be wirelessly communicably coupled using any known wireless communication protocol such as radio-frequency communication, cellular telephone communication, wireless local area network communication, or any other wireless communication method known or to be developed. Tracking device 50 in this embodiment is a GPS tracking device designed to receive location data sent from a GPS transmitter as is known in the art. In this embodiment tracking device 50 is a handheld GPS tracking unit held by a fishermen on boat 126. Tracking device 50 displays the location data representing the location of satellite signal receiver 132, which also represents the location of buoy 120, and the fishermen are able to maneuver boat 126 to this location to retrieve buoy 120 and underwater equipment 11, which in this embodiment is lobster trap 122—which is now hopefully full of lobsters.

Figure 4:
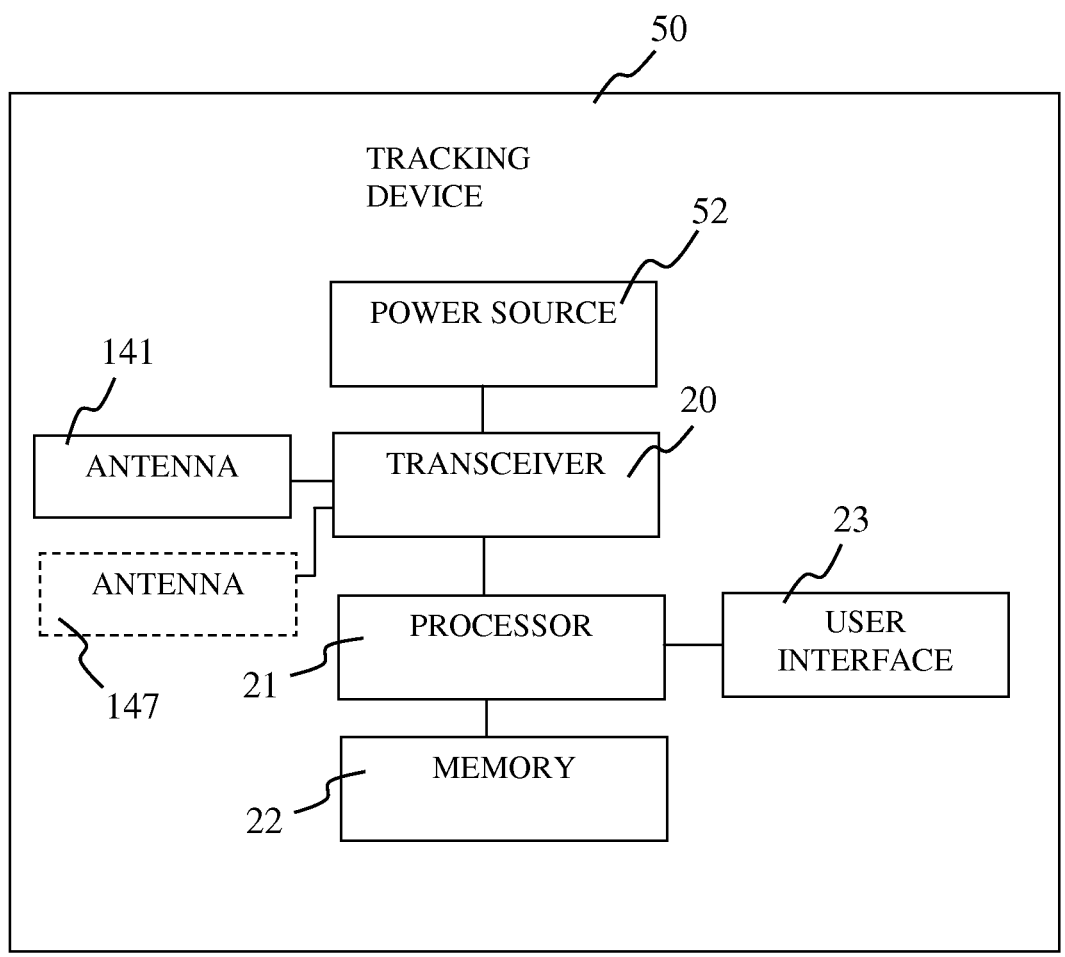
FIG. 4 is a block diagram of one embodiment of tracking device 50.

FIG. 4 shows a block diagram of one embodiment of a tracking device 50 that can be used with system for tracking underwater equipment 112. Optional boat-mounted radio-frequency antenna 147 is shown in dashed lines. In some embodiments tracking device 50 is not a part of system for tracking underwater equipment 112. In some embodiments tracking device 50 is a part of system for tracking underwater equipment 112. Whether tracking device 50 is or is not a part of system for tracking underwater equipment 112 depends on consumer preference, such as whether the consumer already has a tracking device 50 they can use with system 112, as well as specific product availability and demand. In this embodiment tracking device 50 is included in system for tracking underwater equipment 112. Tracking device 50 in this embodiment includes power source 52. Tracking device 50 is a handheld tracking unit in this embodiment, as shown in FIG. 1, and power source 52 is a set of batteries. Power source 52 can be any power source, including a wall plug power source or a battery charger. In some embodiments tracking unit 52 can be included in the equipment console of a boat, or in a vehicle, or land-based equipment. In some embodiments tracking device 50 is one of the common GPS tracking devices commercially available. Tracking device 50 can be part of a mobile phone, a computer, a hand-held device or a larger piece of electronic equipment.

Tracking device 50 also includes antenna 141 and transceiver 20 for receiving signals from position sensing unit 130. In some embodiments tracking device 50 uses boat-mounted radio-frequency antenna 147 to receive radio-frequency signals from position sensing unit 130. Boat-mounted antenna 147 can be used in embodiments where tracking device 50 is mounted in the console of the boat. Alternatively, in some embodiments handheld tracking device 50 can be connected to boat-mounted antenna 147 to allow tracking device 50 improved radio-frequency reception capability, such as in clouds and storms. Memory 22 and processor 21 are used to process and display location data and other data. Memory 22 includes programmable software instructions that are executed by the processor. In particular, the programmable software instructions include a plurality of chronological operating steps that define a control logic algorithm for performing the intended functions of the invention. Such software instructions may be written in a variety of computer program languages such as C++, Fortran and Pascal, for example. One skilled in the art understands that such software instructions may contain various Boolean logic processes that perform the intended function of system for tracking underwater equipment 112. Therefore, the specific source or object code of the software program is not intended to be a limiting factor in executing system 112's intended function. Memory 22, which enables storage of data and programs, may include RAM, ROM, flash memory and any other form of readable and writable storage medium known in the art or hereafter developed. Memory 22 may be a separate component or an integral part of another component such as processor 21.

Processor 21 may include a microprocessor or other devices capable of being programmed or configured to perform computations and instruction processing in accordance with the invention. Such other devices may include microcontrollers, digital signal processors (DSP), Complex Programmable Logic Device (CPLD), Field Programmable Gate Arrays (FPGA), application-specific integrated circuits (ASIC), discrete gate logic, and/or other integrated circuits, hardware or firmware in lieu of or in addition to a microprocessor. Functions and process steps described herein may be performed using programmed computer devices and related hardware, peripherals, equipment and networks. When programmed, the computing devices are configured to perform functions and carry out steps in accordance with principles of the invention. Such programming may comprise operating systems, software applications, software modules, scripts, files, data, digital signal processors (DSP), application-specific integrated circuit (ASIC), discrete gate logic, or other hardware, firmware, or any conventional programmable software.

User interface 23 in this embodiment includes display 51. Display 51 is used to display location data. The location data can be displayed as numerical longitude, latitude and elevation data. In some embodiment the location data is placed on a map illustrating the location of satellite signal receiver 132 and buoy 120 on the map. Further, the map may be utilized in conjunction with tracking device 50 to function as a navigation system to direct a user through water and to pots. Tracking device 50 displays the location data in response to receiving the location data from transmitter 134 of position sensing unit 130. In some embodiments successive location data readings are mapped to show the movement and location of satellite signal receiver 132 over time. Processor 21 and memory 22 are used in conjunction with user interface 23 to process and display location data and other received or stored data in any way which facilitates the easy location, tracking, and monitoring of satellite signal receiver 132, position sensing unit 130, and underwater equipment 11 that position sensing unit 130 is mounted to.

User interface 23 may include a variety of stand-alone or shared devices that are capable of generating and transmitting a control signal upon receiving a user input. For example, exemplary user interface devices may include a remote controller employing RF, infra-red, acoustic or cellular technology, as well known in the industry. In alternate embodiments, the user interface may include a handheld computer, a PDA, a cell phone, a keyboard, a mouse, etc. that may be comprised of commercially available hardware and software operating systems, for example. The aforementioned user interfaces are intended to represent a broad category of exemplary user interfaces capable of functioning in accordance with the present invention. Of course, the user interfaces may include other components, peripherals and software applications provided they are compatible and capable of cooperating with remaining devices of the invention. In addition, the user interfaces may include information, documents, data and files needed to provide functionality and enable performance of methodologies in accordance with an exemplary embodiment of the invention.

In some embodiments transmitter 134 of position sensing unit 130 is a transponder, which means it only transmits after receiving a transmission request signal. In this embodiment transceiver 20 and antenna 141 of tracking device 50 transmits a transmission request signal to transmitter 134 of position sensing unit 130. Transmitter 134 transmits location data in response to receiving the transmission request signal from tracking device 50. In this way transmitter 134 is a transponder, which transmits the location data in response to receiving a transmission request signal from tracking device 50. This saves the battery power of position sensing unit 130, because it is only transmitting location data after receiving a transmission request signal, instead of continuous transmission of location data.

In some embodiments transmitter 134 of position sending unit 130 is a transponder which transmits sonar data in response to receiving a transmission request signal. A transmission request signal can be sent to transmitter 134 by tracking device 50 using radio transmission, or a transmission request signal can be sent to transmitter 134 by a sonar device on boat 126 using sonar transmission antenna 127. In some embodiments a transmission request signal is sent to transmitter 134 using other means. Transmitter 134 in this embodiment will transmit a sonar signal in response to receiving a request for transmission. Transmitter 134 will transmit a sonar signal which can be received by sonar antenna 127 on boat 126. In this way transmitter 134, position sensing unit 130, and buoy 120 can be located and tracked using a sonar tracking device. In this way transmitter 134 is a transponder which transmits a sonar signal in response to receiving a transmission request signal. Sonar antenna 127, connected to either an inboard or outboard sonar device on boat 126, can also be used to transmit and receive passive sonar signals. Passive sonar signals can be used as a secondary means to find and locate underwater equipment 11 if position sensing unit 130 is not working or is not being used.

Transmitter 134 is designed in some embodiments to transmit an identification code which uniquely identifies position sensing unit 130. This allows tracking device 50 to receive and to display the unique identification code, and the user of tracking device 50 to identify position sensing unit 130. The unique identification code can be used to determine the owner of the equipment, the type and make of the equipment, or other predetermined information about position sensing unit 130 and underwater equipment 11 that position sensing unit 130 is attached to. The identification code can be used, for example, to determine the owner of underwater equipment 11 so that boats belonging to different owners do not locate and retrieve the wrong equipment. In this way transmitter 134 transmits an identification code unique to position sensing unit 130.

In some embodiments of system for tracking underwater equipment 112, transmitter 134 and tracking device 50 are designed for secure communication. Secure communication means that transmitter 134 and transceiver 20 are communicably coupled in a way that does not allow other tracking devices to send or receive data from or to transmitter 134. Secure communications can be accomplished using encoded transmissions, for example, or cellular phone technology where each transmitter has a unique identifier and communication is not open to others. Secure communication can be accomplished in any number of wireless transmission methods, any one of which can be used with system for tracking underwater equipment 112. Secure communications would ensure that only the user of tracking device 50 specifically designed for secure communication with transmitter 134 of underwater equipment 11 could find and track underwater equipment 11. Secure communications provides another layer of security for underwater equipment 11. In this way communication between transmitter 134 and tracking device 50 is secure.

Figure 5:
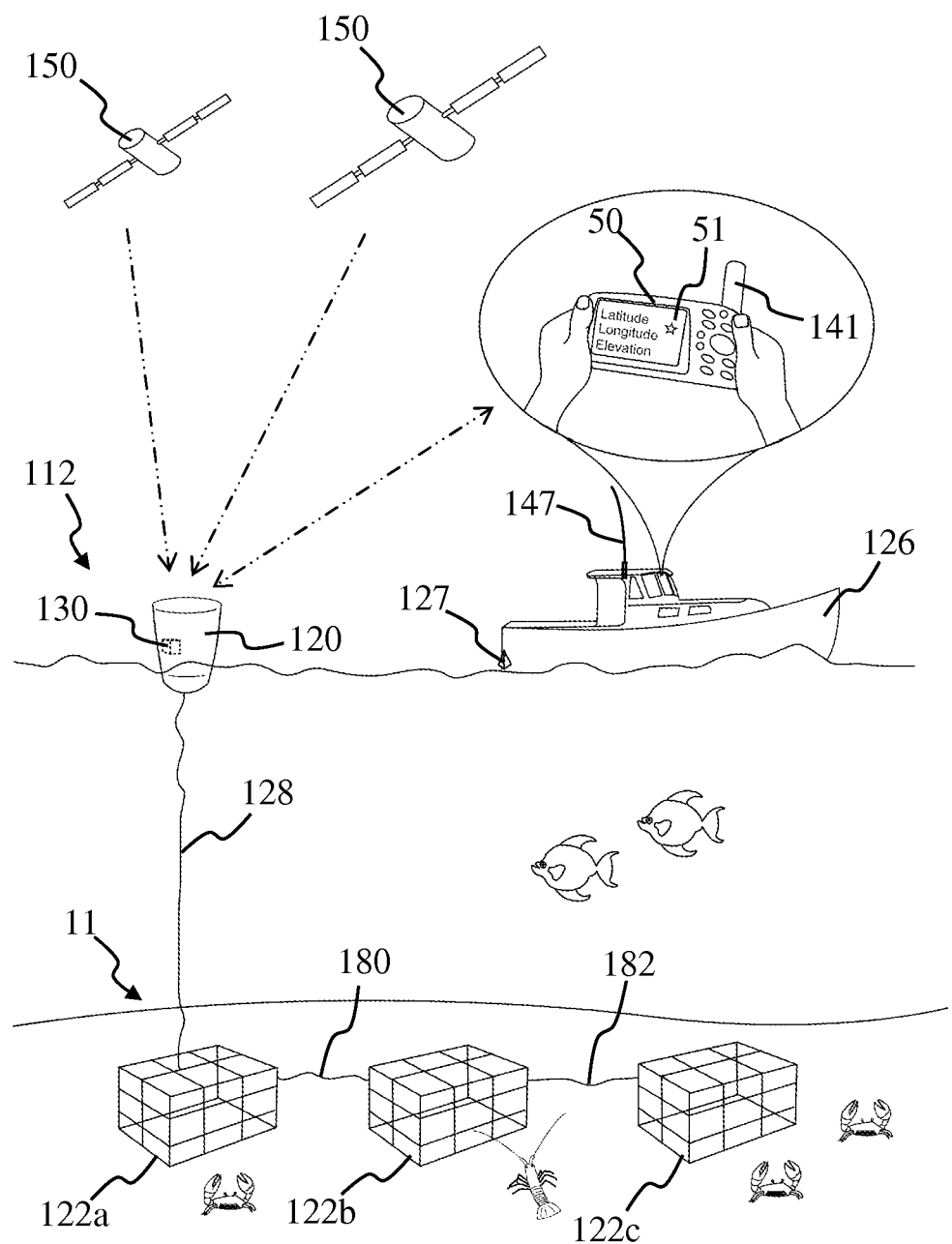
FIG. 5 shows a pictorial view of a further embodiment of a system for tracking underwater equipment 112 according to the invention, where system 112 includes buoy 120, position sensing unit 130 and a plurality of underwater animal traps 122.
Figure 6:
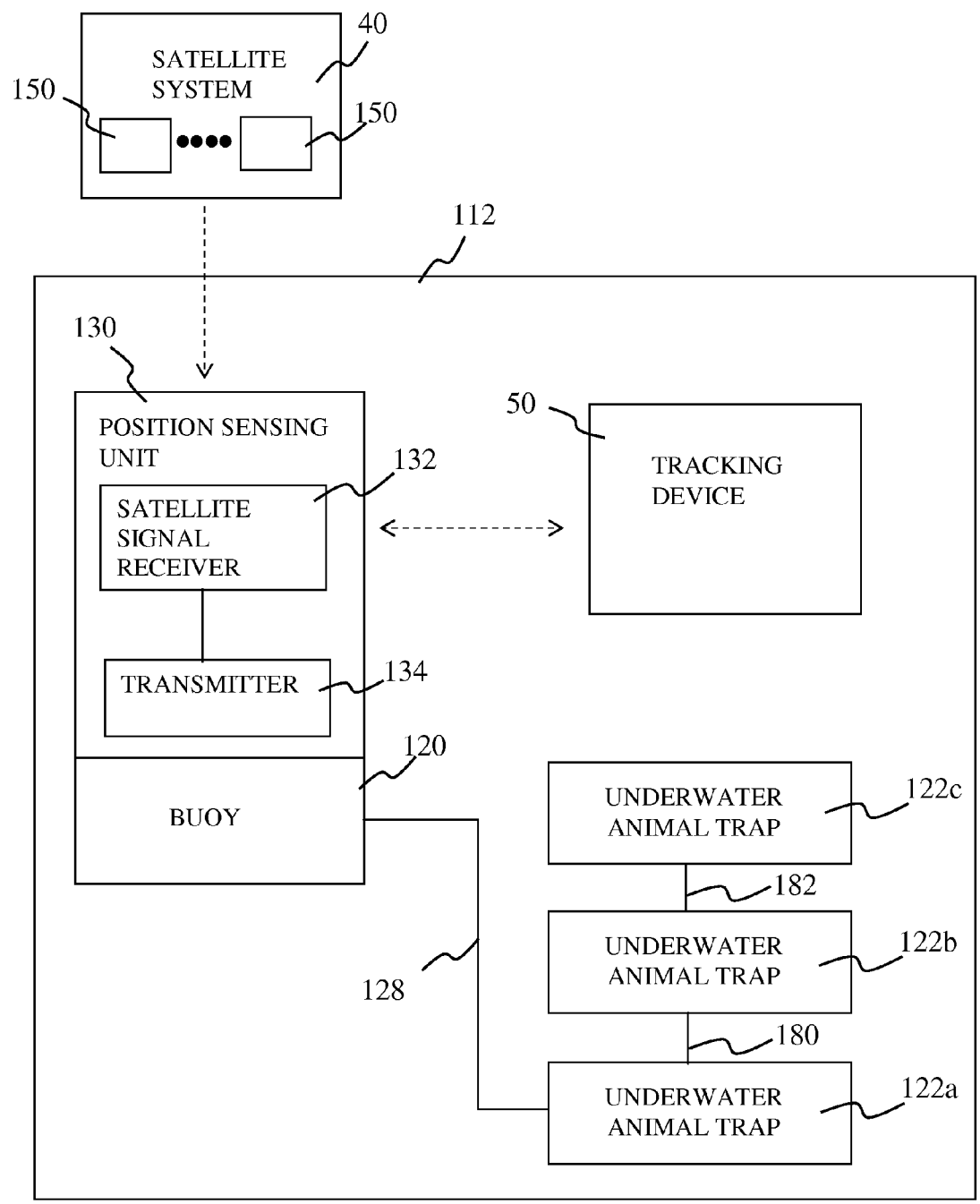
FIG. 6 is a block diagram of one embodiment of system for tracking underwater equipment 112 according to the invention as shown in FIG. 5.

FIG. 5 shows a pictorial representation of another embodiment of system for tracking underwater equipment 112 according to the invention. FIG. 6 shows a block diagram of one embodiment of system 112 according to the invention as shown in FIG. 5. In this embodiment underwater equipment 11 includes a plurality of underwater animal traps 122. Multiple underwater animal traps 122 are mechanically coupled to buoy 120. Underwater animal trap 122a is mechanically coupled to buoy 120 using line 128. Underwater animal trap 122b is mechanically coupled to underwater animal trap 122a using line 180. Underwater animal trap 122c is mechanically coupled to underwater animal trap 122b using line 182. In this way a plurality of underwater animal traps 122 are mechanically coupled to buoy 120. In this embodiment the owner of underwater animal traps 122 is relying on position sensing unit 130 and lines 128, 180, and 182 to locate the multiple traps 122. Other elements of system for tracking underwater equipment 112 as shown in FIG. 5 and FIG. 6 are the same as that described with regard to FIG. 1 through FIG. 4.

In some situations using buoy 120 to track and locate one or more underwater animal traps 122 provides sufficient location and tracking detail. In some situations, however, traps 122 can get separated from buoy 120 and other traps 122. There are numerous ways in which traps 122 and buoys 120 can be separated. In some instances traps 120 are caught in draggers—nets used for catching fish or other sea animals by dragging the net along the sea bottom. In some instances buoy 120 is separated from traps 122 or submerged by sharks, seals, or dolphins which like to play with buoy 120. In some instances wind and rocks can separate buoy 120 from trap 122. It is desirable in some situations to have a secondary position sensing unit to provide redundancy in case buoy 120 and underwater animal trap 122 become separated.

Figure 7:
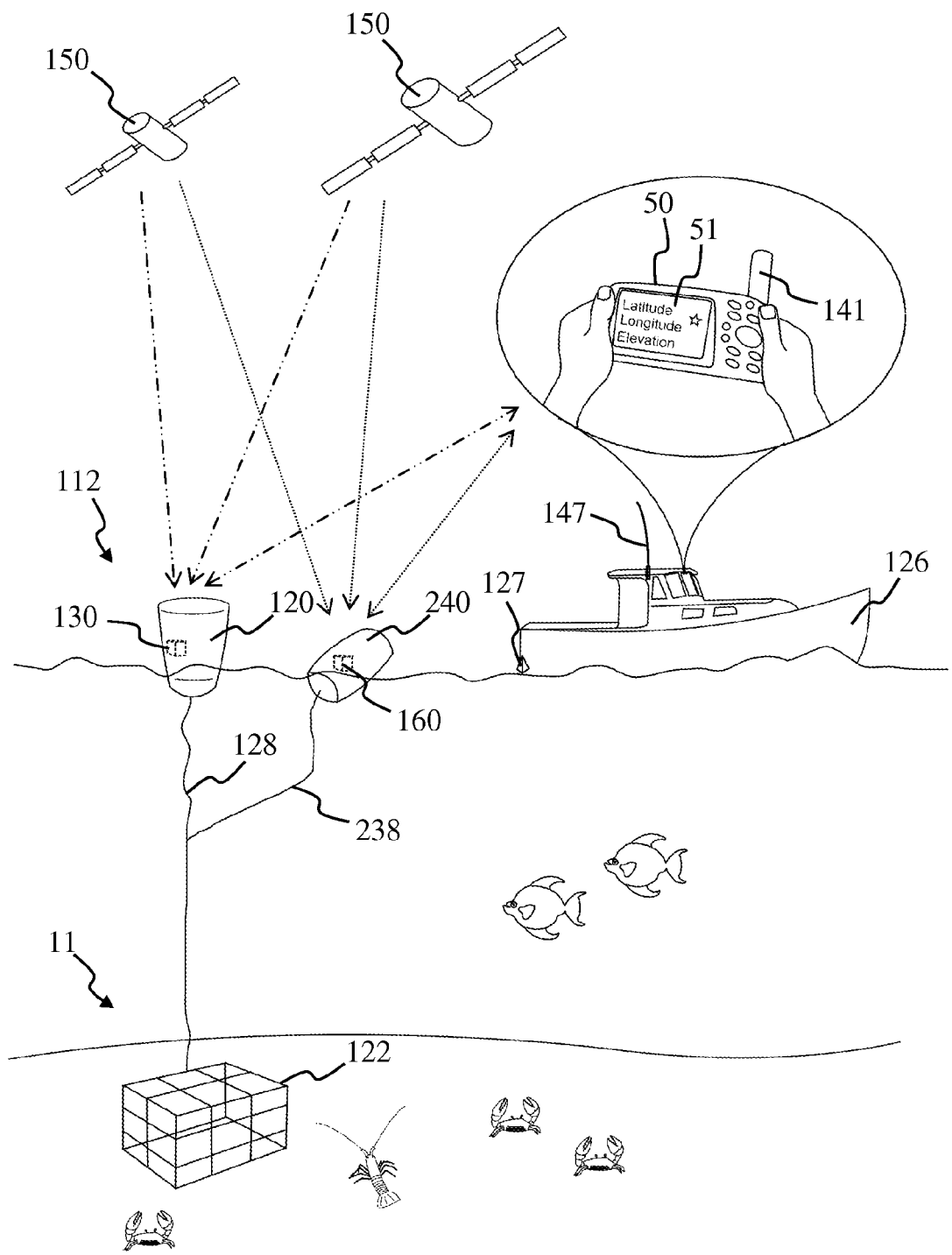
FIG. 7 shows a pictorial view of another embodiment of a system for tracking underwater equipment 112 according to the invention, where system 112 includes buoy 120, position sensing unit 130, underwater animal trap 122, secondary buoy 240, and secondary position sensing unit 160.
Figure 8:
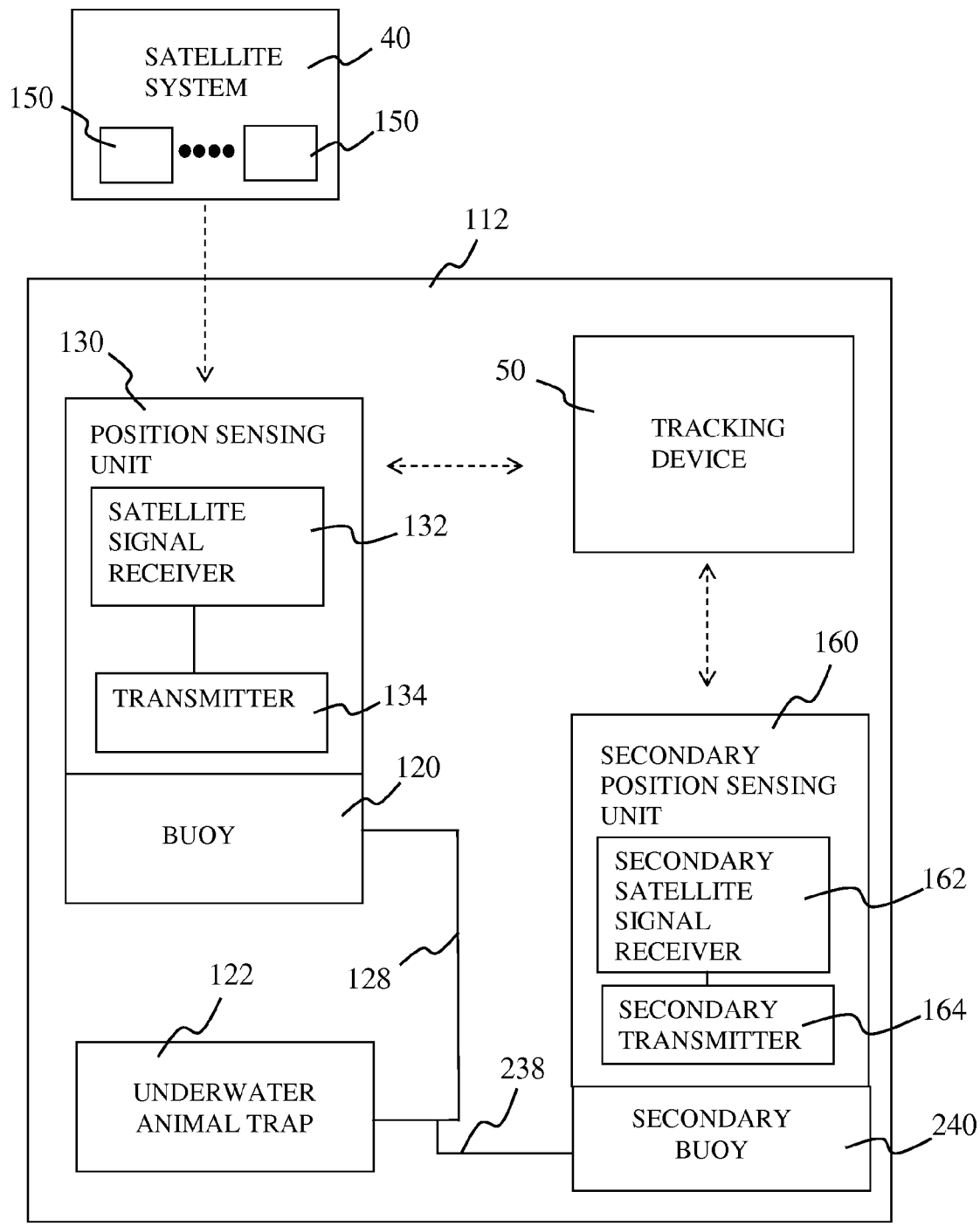
FIG. 8 is a block diagram of one embodiment of system for tracking underwater equipment 112 according to the invention as shown in FIG. 7.

FIG. 7 shows a pictorial illustration of a further embodiment of system for tracking underwater equipment 112 according to the invention. In this embodiment system 112 includes secondary position sensing unit 160, which is contained in or coupled to secondary buoy 240. Secondary buoy 240 is connected to underwater animal trap 122 with line 238. In this way secondary buoy 240 and secondary position sensing unit 160 provide redundancy in case buoy 120 becomes disconnected from underwater animal trap 122 or buoy 120 becomes submerged. Secondary buoy 240 can be any type of buoy, similar to or different from buoy 120. Secondary buoy 240 can be coupled to underwater equipment 11 in any way, or connected to line 128 connecting underwater equipment 11 to buoy 120. FIG. 8 shows a block diagram of one embodiment of system 112 including secondary position sensing unit 160 as shown in FIG. 7. In this embodiment secondary position sensing unit 160 includes secondary satellite signal receiver 162, and secondary transmitter 164. Secondary satellite signal receiver 162 computes secondary location data in response to receiving signals from multiple satellites. Secondary location data is the location data describing the location of secondary satellite signal receiver 162. Secondary location data includes the latitude, longitude, and elevation of secondary satellite signal receiver 162. In some embodiments secondary location data includes more or less data than the latitude, longitude, and elevation of secondary satellite signal receiver 162. Secondary satellite signal receiver 162 in this embodiment operates the same or similar to satellite signal receiver 132. Since secondary satellite signal receiver is coupled to secondary buoy 240, secondary satellite signal receiver 162 is computing secondary buoy 240 location data instead of the buoy 120 location data that satellite signal receiver 132 is computing. Secondary transmitter 164 transmits the secondary buoy 240 location data. Secondary transmitter 164 in this embodiment is wirelessly transmitting secondary location data to tracking device 50. In this way tracking device 50 can locate and track buoy 120 and secondary buoy 240 separately by receiving separate wireless signals, one from transmitter 134 of position sensing unit 130, and one from transmitter 164 of secondary position sensing unit 160. In some embodiments secondary transmitter 164 is a transponder which transmits in response to receiving a transmission request signal. In some embodiments secondary transmitter 164 transmits sonar signals so that it can be tracked using a sonar tracking device. Secondary buoy 240 and secondary position sensing unit 160 provide a means to locate underwater animal trap 122 when buoy 120 and underwater animal trap 122 are disconnected from each other.

Figure 9:
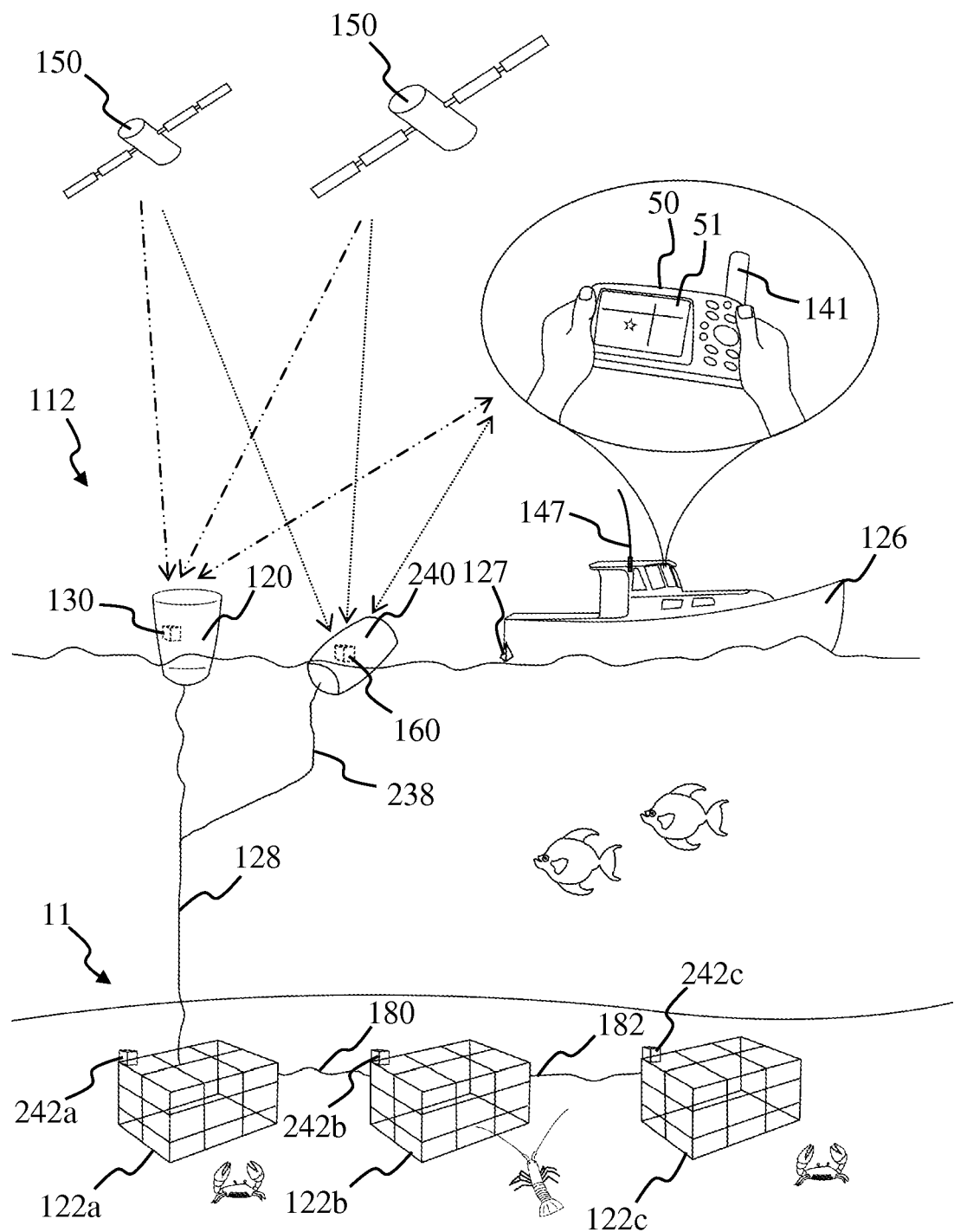
FIG. 9 shows a pictorial view of another embodiment of system for tracking underwater equipment 112 according to the invention, where system 112 includes buoy 120, position sensing unit 130, secondary buoy 240, secondary position sensing unit 160, a plurality of underwater animal traps 122, and a plurality of trap sensing units 242.
Figure 10:
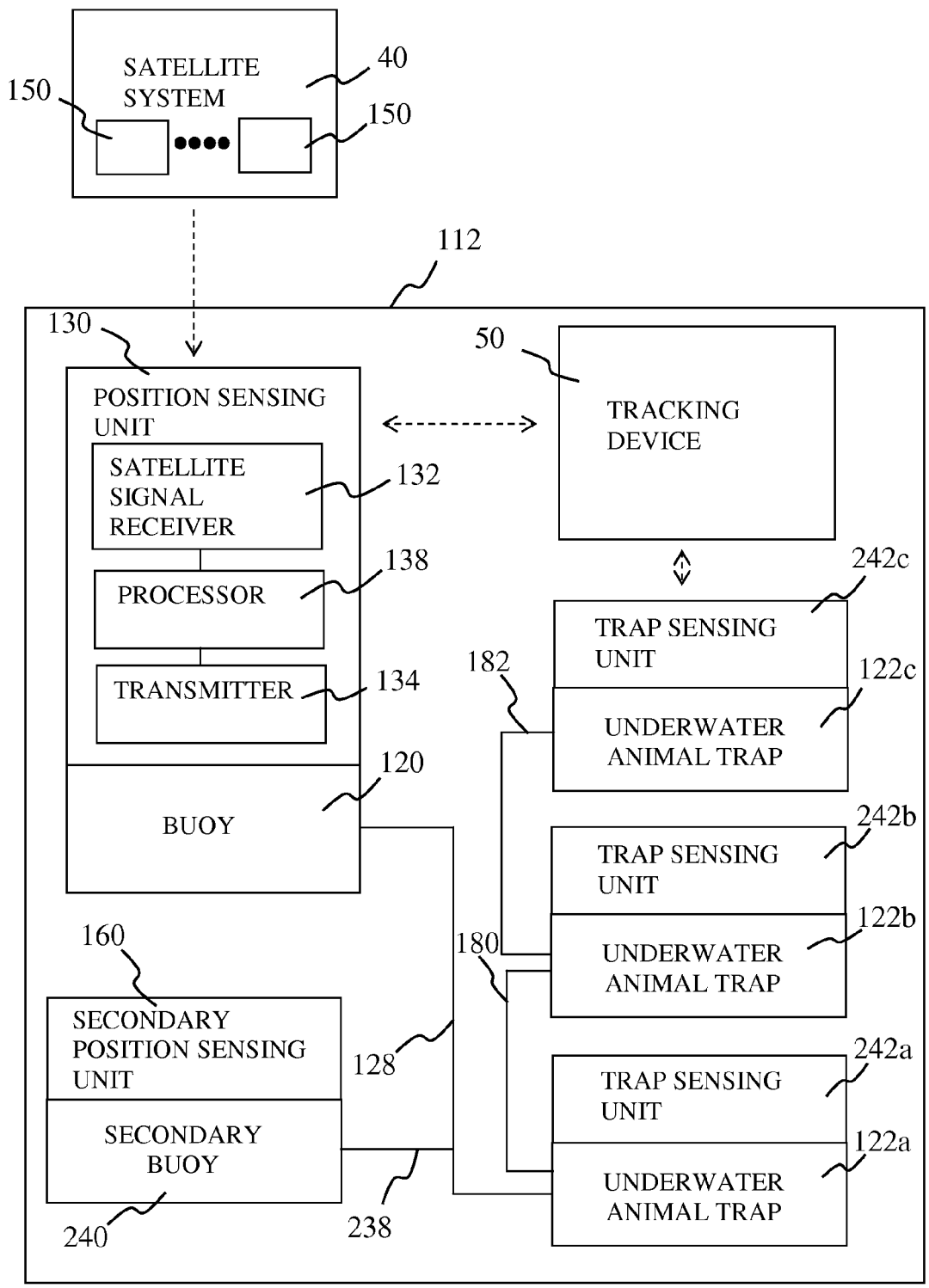
FIG. 10 is a block diagram of one embodiment of system for tracking underwater equipment 112 according to the invention as shown in FIG. 9.
Figure 11:
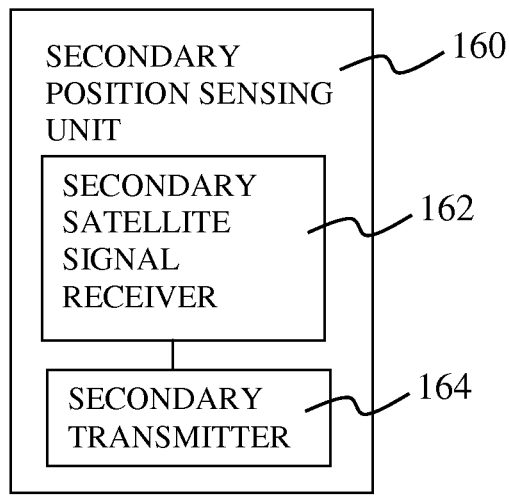
FIG. 11 is a block diagram of one embodiment of secondary position sensing unit 160 according to the invention.

FIG. 9 shows a pictorial illustration of a further embodiment of system for tracking underwater equipment 112 according to the invention. FIG. 10 shows a block diagram of one embodiment of system for tracking underwater equipment 112 of FIG. 9. System for tracking underwater animal equipment 112 in this embodiment includes buoy 120 and position sensing unit 130, as explained earlier with regard to FIG. 1 through FIG. 8. System for tracking underwater animal equipment 112 in this embodiment includes secondary buoy 240 and secondary position sensing unit 160 as shown in block diagram form in FIG. 10 and FIG. 11 and as explained earlier with regard to FIG. 7 and FIG. 8. In this embodiment position sensing unit 130 include processor 138. Processor 138 processes data for position sensing unit 130. In this embodiment processor 138 processes data for transmission by transmitter 134.

In this embodiment underwater equipment 11 includes a plurality of pieces of underwater equipment 122, which in this embodiment takes the form of a plurality of underwater animal traps 122. In this way system 112 includes buoy 120 and a plurality of pieces of underwater equipment 122 mechanically coupled to buoy 120. In this way system 112 includes secondary buoy 240 and a plurality of pieces of underwater equipment 122 mechanically coupled to secondary buoy 240. In this embodiment each underwater animal trap 122 includes a trap sensing unit 242 coupled to it. Trap sensing unit 242 can be used to provide a variety of sensing functions for each underwater animal trap 122. Trap sensing unit 242a is coupled to underwater animal trap 122a, trap sensing unit 242b is coupled to underwater animal trap 122b, and trap sensing unit 242c is coupled to underwater animal trap 122c.

Processor 138 may include a microprocessor or other devices capable of being programmed or configured to perform computations and instruction processing in accordance with the invention. Such other devices may include microcontrollers, digital signal processors (DSP), Complex Programmable Logic Device (CPLD), Field Programmable Gate Arrays (FPGA), application-specific integrated circuits (ASIC), discrete gate logic, and/or other integrated circuits, hardware or firmware in lieu of or in addition to a microprocessor. Functions and process steps described herein may be performed using programmed computer devices and related hardware, peripherals, equipment and networks. When programmed, the computing devices are configured to perform functions and carry out steps in accordance with principles of the invention. Such programming may comprise operating systems, software applications, software modules, scripts, files, data, digital signal processors (DSP), application-specific integrated circuit (ASIC), discrete gate logic, or other hardware, firmware, or any conventional programmable software.

Figure 12:
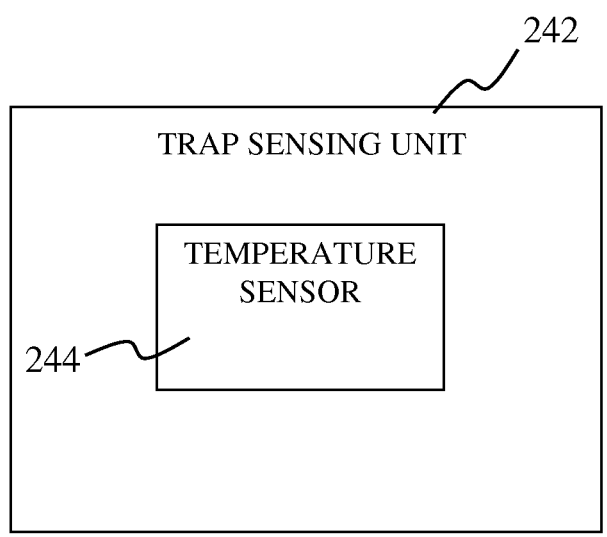
FIG. 12 is a block diagram of one embodiment of trap sensing unit 242 according to the invention.
Figure 13:
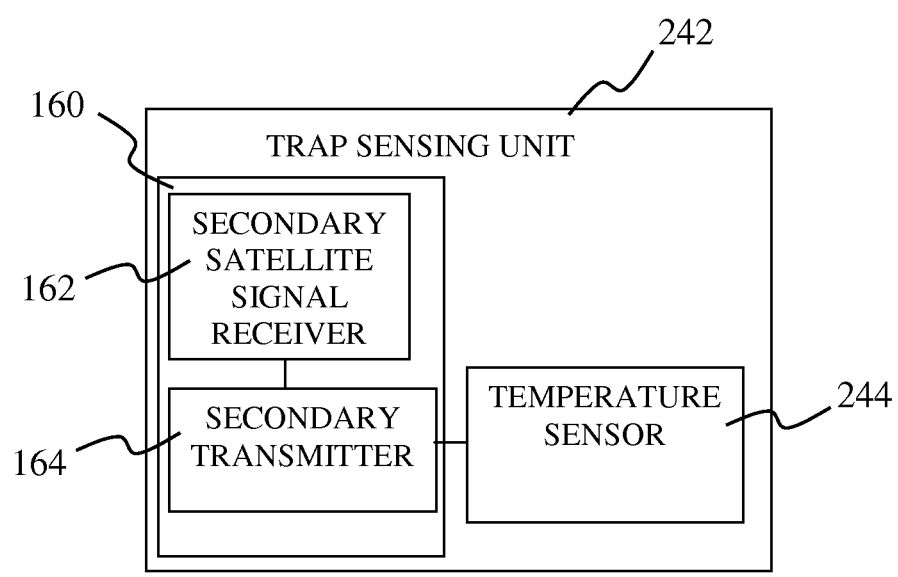
FIG. 13 is a block diagram of another embodiment of trap sensing unit 242 according to the invention.

FIG. 12 and FIG. 13 show block diagrams of embodiments of trap sensing unit 242. FIG. 12 shows trap sensing unit 242 including temperature sensor 244. Temperature sensor 244 can be used to sense and transmit the temperature of the water around underwater animal trap 122. Tracking device 50 can receive and display the temperature data, allowing the user of tracking device 50 to determine the water temperature around each underwater animal trap 122. Water temperature is important to trappers because certain types of animals live in certain water temperatures. It is therefore best to place underwater animal traps 122 in places where the water temperature is most conducive to finding the animal to be trapped. Temperature sensor 244 of trap sensing unit 242 can be used to determine if underwater animal traps 122 are placed in a good location or if they should be moved. In this way system 112 includes temperature sensor 244 coupled to underwater animal traps 122, where temperature sensor 244 send temperature data to tracking device 50. In some embodiments trap sensing unit 242 is coupled to a single underwater animal trap 122. In some embodiments trap sensing unit 242 is coupled to each underwater animal trap 122. In some embodiments trap sensing unit 242 is coupled to some but not all underwater animal traps 122. In this way system 112 includes a plurality of temperature sensors 244, where each one of the plurality of temperature sensors 244 is coupled to a corresponding one of the plurality of underwater animal traps 122, where each temperature sensor 244 sends temperature data to tracking device 50.

FIG. 13 shows a block diagram of a trap sensing unit 242 which includes a secondary position sensing unit 160 and temperature sensor 244. Secondary position sensing unit 160 includes a secondary satellite signal receiver 162 and a secondary transmitter 164. In this embodiment trap sensing unit 242 has all of the capabilities explained earlier with regard to secondary position sensing unit 160. Secondary position sensing unit 160 computes and transmits secondary location data representing the location of the specific underwater animal trap 122 that trap sensing unit 242 is attached to. Tracking device 50 receives and displays the location of secondary position sensing unit 160 as well as the temperature of the water as sensed and transmitted by temperature sensor 244. In this embodiment each underwater animal trap 122 that has trap sensing unit 242 coupled to it can be individually located and tracked.

Figure 14:
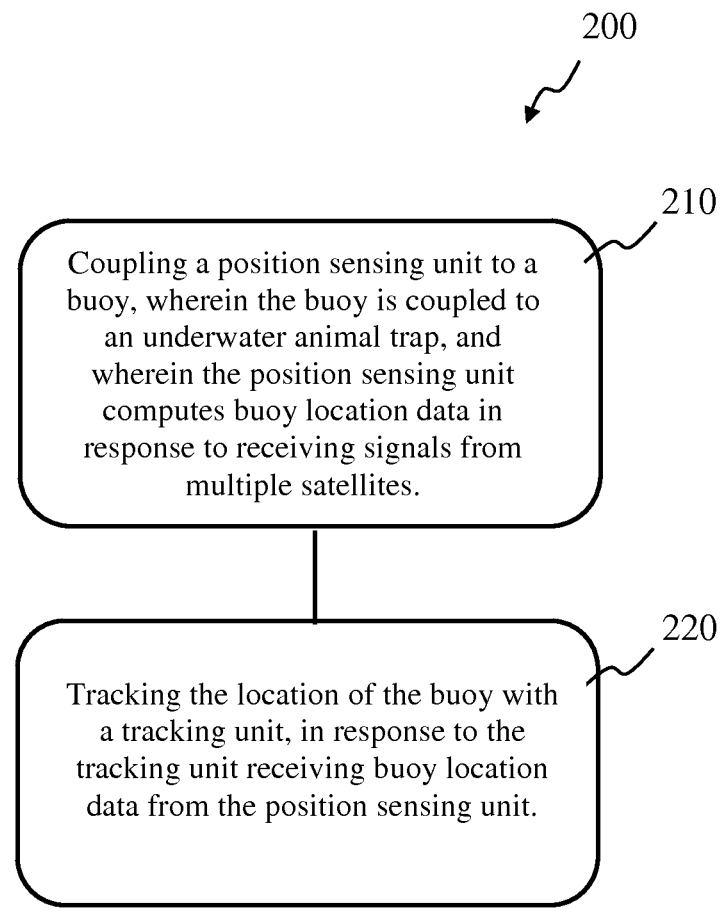
FIG. 14 shows method 200 of tracking an underwater animal trap according to the invention.

FIG. 14 shows method 200 of tracking an underwater animal trap according to the invention including step 210 coupling a position sensing unit to a buoy, wherein the buoy is coupled to an underwater animal trap, and wherein the position sensing unit computes buoy location data in response to receiving signals from multiple satellites. Method 200 also includes step 220 tracking the location of the buoy with a tracking unit, in response to the tracking unit receiving buoy location data from the position sensing unit.

Method 200 can include many other steps, In some embodiments method 200 includes coupling a secondary position sensing unit to a secondary buoy, wherein the secondary position sensing unit computes secondary buoy location data in response to receiving signals from multiple satellites. In some embodiments method 200 includes tracking the location of the secondary buoy with the tracking unit, in response to the tracking unit receiving secondary buoy location data from the secondary position sensing unit. In some embodiment method 200 includes transmitting a request for location data from the tracking unit to the position sensing unit. In some embodiments method 200 includes coupling a temperature sensor to the underwater animal trap, wherein the temperature sensor sends temperature data to the position sensing unit.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, buoy 120 can be taken to mean any type of equipment which sits on top of the water, such as a drilling rig, a boat, a float, etc. Underwater equipment 11 can be mechanically coupled to any type of buoy 120, where buoy 120 can be any item or piece of equipment which sits in or on top of the water.

The invention claimed is:

1. A system for tracking underwater equipment comprising:
   a buoy;
   an underwater animal trap mechanically coupled to the buoy; and
   a position sensing unit attached to the buoy, wherein the position sensing unit comprises:
      a satellite signal receiver, wherein the satellite signal receiver computes location data in response to receiving signals from multiple satellites;
      a transmitter, wherein the transmitter transmits the location data;
   a secondary buoy coupled to the underwater animal trap;
   a secondary position sensing unit coupled to the secondary buoy, wherein the secondary position sensing unit comprises:
      a secondary satellite signal receiver, wherein the secondary satellite signal receiver computes secondary location data in response to receiving signals from multiple satellites; and
      a secondary transmitter, wherein the secondary transmitter transmits the secondary location data; and
   means for using the second buoy in the event of malfunction or loss of the buoy.

2. The system for tracking underwater equipment of claim 1, further including a tracking device, wherein the tracking device displays the location data in response to receiving the location data.

3. The system for tracking underwater equipment of claim 2, wherein the transmitter is a transponder and the transponder transmits the location data in response to receiving a transmission request signal from the tracking device.

4. The system for tracking underwater equipment of claim 1, wherein the transmitter is a transponder and the transponder transmits a sonar signal in response to receiving a transmission request signal.

5. The system for tracking underwater equipment of claim 1, wherein the tracking device displays the secondary location data in response to receiving the secondary location data.

6. The system for tracking underwater equipment of claim 1, wherein the transmitter transmits an identification code unique to the position sensing unit.

7. The system for tracking underwater equipment of claim 2, further including a temperature sensor coupled to the underwater animal trap, wherein the temperature sensor measures temperature of water in the vicinity of the underwater animal trap and sends temperature data to the tracking device.

8. The system for tracking underwater equipment of claim 2, wherein communication between the transmitter and the tracking device is secure.

9. A method of tracking an underwater animal trap comprising:
  coupling a position sensing unit to a buoy, wherein the buoy is coupled to an underwater animal trap, and wherein the position sensing unit computes buoy location data in response to receiving signals from multiple satellites;
  tracking the location of the buoy with a tracking unit, in response to the tracking unit receiving buoy location data from the position sensing unit;
  coupling a secondary position sensing unit to a secondary buoy, wherein the secondary buoy is coupled to the underwater animal trap, and wherein the secondary position sensing unit computes secondary buoy location data in response to receiving signals from multiple satellites; and
  tracking the location of the secondary buoy with the tracking unit, in response to malfunction or loss of the buoy, wherein the tracking unit receives secondary buoy location data from the secondary position sensing unit.

10. The method of tracking an underwater animal trap of claim 9, further including transmitting a request for location data from the tracking unit to the position sensing unit.

11. The method of tracking an underwater animal trap of claim 9, further including coupling a temperature sensor to the underwater animal trap, wherein the temperature sensor measures temperature of water in the vicinity of the underwater animal trap and sends temperature data to the tracking unit.

12. The method of tracking an underwater animal trap of claim 11, further comprising moving the underwater animal trap in response to temperature data that is not conducive to the animal to be trapped.

* * * * *